C. B. Field.
Rotary Cultivator.

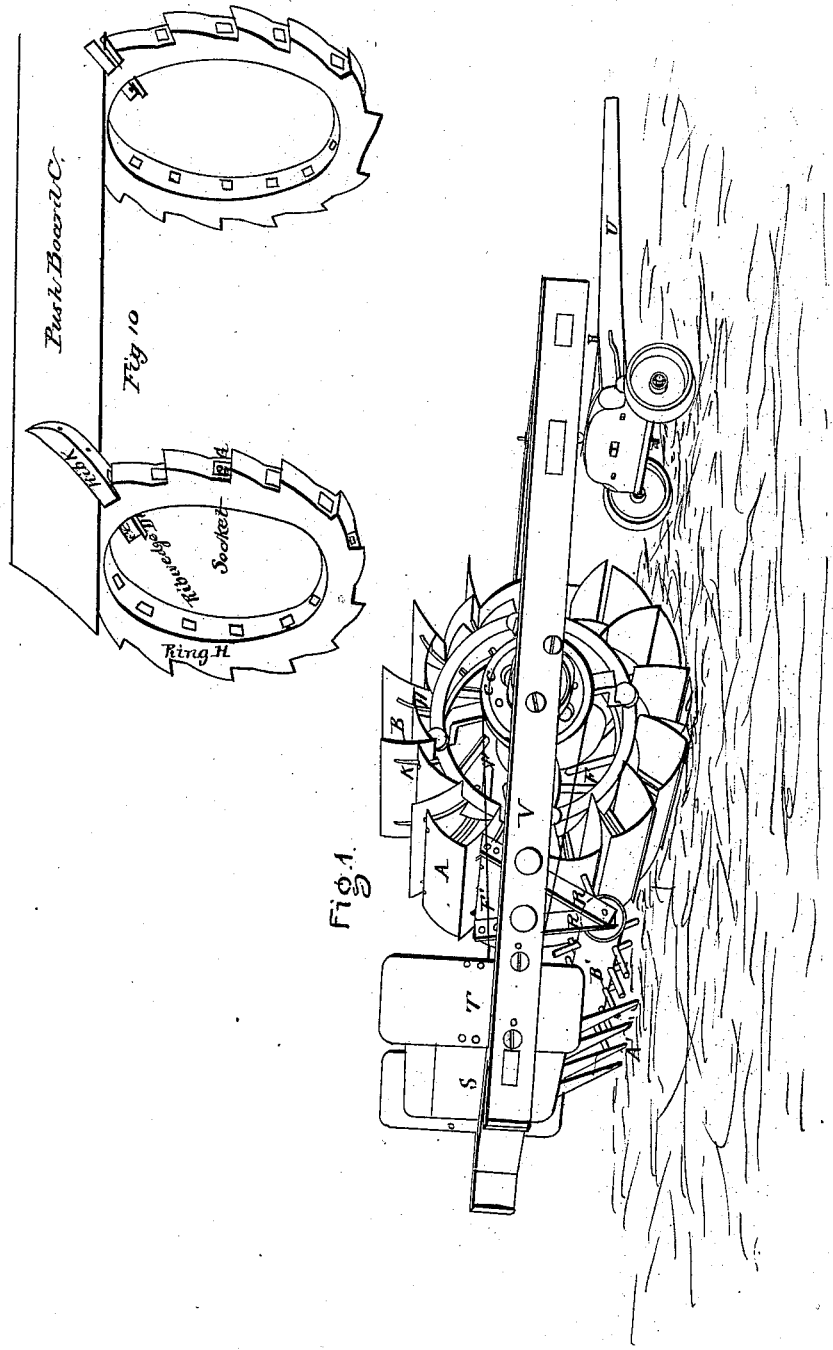

N° 10,624. Patented Mar. 14, 1854.

G. B. Field.
Rotary Cultivator.
N°. 10,624.    Patented Mar. 14, 1864.
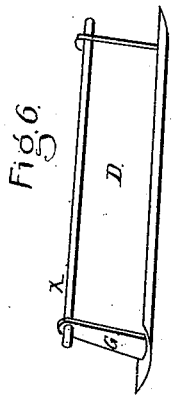
Fig. 6.
Fig. 7.
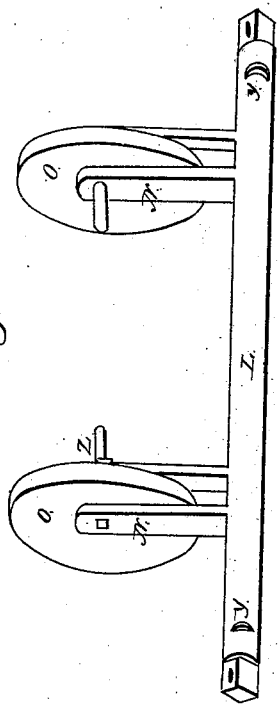
Fig. 8.
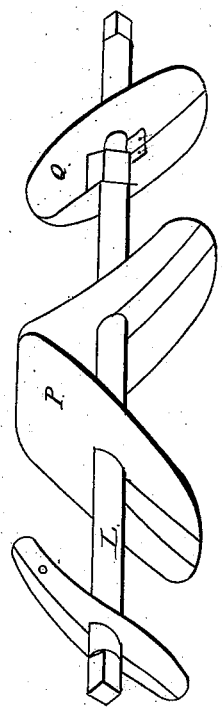
Fig. 9.
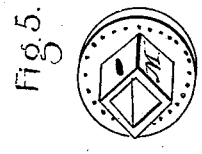
Fig. 5.

UNITED STATES PATENT OFFICE.

GEO. B. FIELD, OF ST. LOUIS, MISSOURI.

IMPROVEMENT IN ROTARY CULTIVATORS.

Specification forming part of Letters Patent No. 10,624, dated March 14, 1854.

*To all whom it may concern:*

Be it known that I, GEORGE B. FIELD, of the city of St. Louis, in the county of St. Louis and State of Missouri, have invented a new and useful machine for plowing the soil and sowing and harrowing grain at one operation, which I call "Field's Rolling Plow;" and I do hereby declare that the following is a full, clear, and exact description of the construction and operation of the same, reference being had to the annexed drawings, making a part of this specification, in which—

Figure 4:
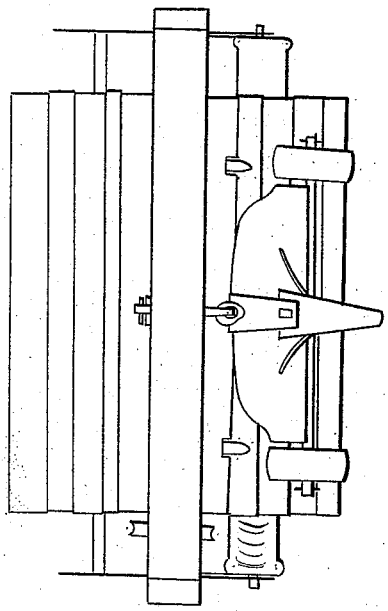
Figure 2:
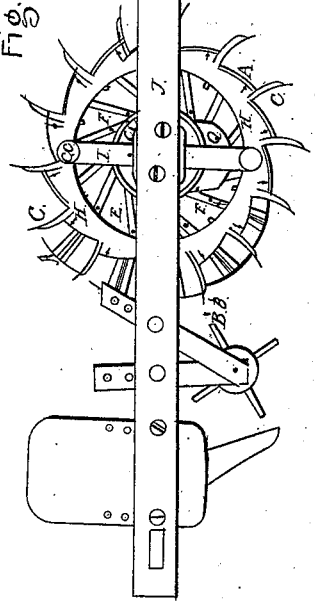
Figure 3:
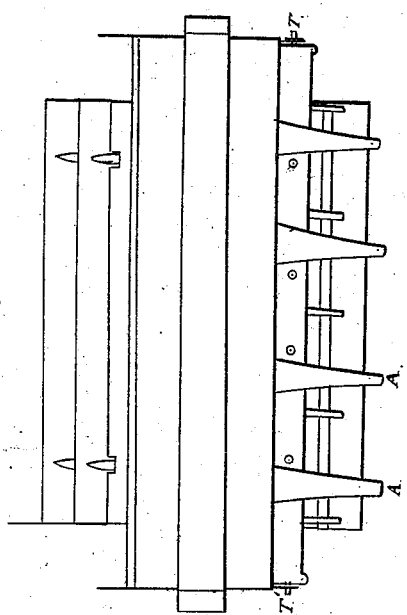

Figure 1 is a perspective view; Fig. 2, a longitudinal elevation; Fig. 3, a transverse section, exhibiting a back view of the plow harrow and drill; and Fig. 4, a section exhibiting a front view of the plow, &c.; also, the following-named figures, exhibiting a view of the machinery on the inside of the plow: Fig. 5, a shaft-head for securing firmly the ends of the shaft to the sides of the frame V. Fig. 6 is the push-board with the attachments D, G, and K. Fig. 7 is a friction-pulley for the ends of the back rods, X. Fig. 8 is the iron plow-shaft, which passes through the center of the plow, with the push-wheels O for the purpose of forcing the push-board out, thereby throwing the dirt or earth off from the plow at the proper time. Fig. 9 represents the plow-shaft with the aprons P and Q for the purpose of cleaning the plow from the dirt which works into the center while the plow is in operation.

To enable others to make and use my invention, I will proceed to describe its construction and operation.

I make the rings H, Fig. 2, either of cast or wrought iron, or parts of each, about two feet in diameter, not, however, restricting myself to any particular size. These rings are perforated by holes or sockets from four to twelve inches apart, running from the outer to the inside edges, the number of sockets varying according to the diameter of the ring and number of shovels required to be used. Having determined upon the length of the plow to be constructed, I place the necessary number of rings side by side in a row, securing them so that they will stand on their edges from one to three feet or more apart, according to the degree of strength required. I then place the shovel c, Fig. 10, so that it will rest on its edge across the top of the rings H, and pass the shanks of the ribs K on the shovel through the sockets of the rings H. I then secure them by driving in the rib-wedges D', and to prevent the rib-wedges from working loose I drive in a small wedge, e e, between the rib and the wedge D', cross-grooves being made in the ribs K and wedge D' for the purpose of admitting the wedge e e. In like manner I attach to the rings the whole number of shovels required, care being taken to have the shovels in parallel lines with each other, as well as at equal distances from each other. The regulators E, Fig. 2, when they are not cast solid with the rings H, but made separately, may now be fastened by bolts and screws, or otherwise, to the inside of each of the rings H when there are not more than two rings. I then, after bolting the head and arms I and J onto the ring H on one end of the plow, pass the plow-shaft L, Fig. 5, through the plow from the end opposite the head and arms I and J until the friction-pulley of the plow-shaft rests in its proper place in the head J, the push-wheels O being detached from the shaft before placing it in the plow. After the shaft L is in its place I then put in the push-wheels O, as in Fig. 8, and the center apron, P, as in Fig. 9, after which I bolt in the other head and arms I and J, which may be made of cast or wrought iron, as also the shaft, shaft-arms N, and push-wheels O. The plow-shaft may be used with or without friction-pulleys, and with two or more push-wheels, if required. I then pass the push-board and its attachments, as represented in Fig. 6, (after first drawing out the back rod, X,) between the shovels, so that the back of the push-board D and the side binders, G, will slip in toward the center of the plow between the rings H until the push-board A, Fig. 2, rests on the outer edge of the ring H. The holes in the side binders, G, through which the back rod, X, is to go, will then be on a line with their appropriate slides, F, Fig. 2. I then drive in the back rod, X, until it passes through each of the side binders, G, and the opposite slide, leaving the rod to project through each of the slides F sufficiently to prevent the push-board from being forced out of its place between the shovels while in operation, to prevent the wearing of the back rods, and making it easier slipping in the slides.

I put onto each end of the back rods a friction-pulley, W, Plate 4, though these friction-pulleys may be dispensed with, if preferred. In like manner I put in all the push-boards, being the same number as the shovels. I then fasten to the plow-shaft L the outside aprons, Q, as in Fig. 9, also Fig. 2, the apron resting diagonally across the shaft, so that about half the apron will be one each side of the regulator E. These aprons are for the purpose of clearing the plow of dirt, &c., which works into the center while in operation. I then place the two shaft-heads M, Fig. 5, firmly one on each end of the plow-shaft, the ends of the shaft being squared to fit the socket in the shaft-head, for the purpose of preventing the plow-shaft revolving while the plow is in motion, the plow now being ready to receive the frame, which may be built of wood and iron, or iron alone.

The body of the plow-frame may be put together and lifted over the plow to its proper place and then lowered down until the sides V, Fig. 1, are against the ends of the shaft-heads M, two holes being bored through each side of the frame V to correspond with the holes in the shaft-head M, having turned the plow-shaft to the right position—that is, so that the push-wheels O will be back of the shaft and raised to the height which it is desirable to raise the soil before expelling it from the plow. The shaft-head bolts H H, Fig. 2, are then passed through the sides of the frame V and the corresponding holes in the flange of the shaft-head M and secured firmly by nut and screw.

The drill-pulley C C, Fig. 2, if not cast solid with the arms I nor made in segments, should be bolted to the arms previous to putting on the plow-frame. The harrow B′, Fig. 1, may then be attached, it being composed of a single shaft, may be made of iron or wood, round, square, or otherwise, being filled with holes, so that the harrow-teeth may be driven through the shaft, and as near together as may be desirable in order to pulverize the soil, the width of the harrow to vary according to the length of the plow. The harrow-guides R may first be put on one side of the frame V in their proper place and position behind the plow and secured by bolts running through the side of the frame V and the holes of the guides and secured by nut-washer and screw, the guides R being perforated with holes in order to raise or lower and move forward or back the harrow B′ to the position desired. The journal on the end of the harrow B′ is then run through the two guides R on one side of the frame. The guides on the opposite side may then be placed to their position as the others.

The seed-drill may be placed onto the frame, as represented in Fig. 1. The drill-guides T are composed of a sheet of iron or wood, and secured to the inside of the frame V. Two similar sheets, perforated with holes to correspond with the guides T on the frame, must be secured to the seed-drill box S, one on each end, as represented in Fig. 3. The whole drill apparatus may then be placed on the frame back of the plow, between the guides T, attached to the frame, and secured by bolts passing through the guides T on the frame V and the guides T on the seed-box S, and secured by nut and screw or wedge. By the means of these guides the drill-fingers A′ may be moved to any point required. The drill is made to operate by means of the band F′, running from the drill-pulley C C to the seed-box. No particular construction of drill is intended to be patented, and these diagrams and specifications are for the purpose of explaining how and where the drill may be placed and operated, made in the usual form with fingers.

The plow thus put together is ready for operation, and may be worked by the application of horse, cattle, or steam power. Horses or cattle may be attached to the tongue U in the usual manner, or any other that may be found more desirable.

The operation of plowing or spading is in this wise: The plow-shaft L and the aprons P and Q are secured from revolving, as before described, and as the cattle move the weight of the plow sinks the shovels into the earth a sufficient depth, and this causes the plow or cylinder to roll over the ground at the same time that it turns round the shaft L. When the shovels on the under side of the plow are in the ground the push-boards are forced back toward the center of the plow, between the shovels, until the inside of the push-board rests against the outer edge of the rings H. The push-board and the earth between the shovels remain in this position until the plow revolves around and raises the soil as high above the surface of the ground as may be desirable in order to turn over and thoroughly pulverize the soil. The earth is then expelled or forced from between the shovels by means of the back rod, X, (attached to the push-board,) coming in contact with the push-wheel O, Fig. 8, which forces the push-board A near to the outer edge of the shovels C. The dirt thus expelled falls upon the harrow B′, which occasions the harrow to revolve, it being raised a little above the surface of the ground, and thus tears the sod and pulverizes the earthy matters while in the act of falling from the plow to the ground. The lower end of the fingers of the seed-drill are also placed so that the seed is dropped where the earth as it falls from the plow will cover it, the depth which it is desirable to cover the seed being varied by moving the points of the drill-fingers back or forward and up or down by means of the guides T. When the push-board has passed the push-wheel O and arrived on the top of the plow it then falls back toward the center of the plow by its own weight, and there remains until by another revolution of the plow it is again forced out by the push-wheels O.

In working the plow it is found that dirt and other substances are apt to work through between the shovels and the edges of the push-boards, and, if allowed to remain inside the plow, would clog and impede its easy movement. In order to prevent this and to keep the inside of the plow clean and free from dirt the aprons P and Q are fastened to the shaft L, as in Plate 6, so that the plow in rolling carries the loose dirt, &c., above the aprons and then falls onto the aprons and slides out of the plow. The dirt in and near the center of the plow falls on apron P, slides toward the outer ends of the plow, and is carried by the next revolution of the plow onto aprons Q, from whence it slides out at each end of the plow. If the plow is built large—say over two feet in length—it will not require to be held or guided to keep it upright. A seat may also be placed on the frame before or over the plow, where the driver may sit when plowing with horses.

I claim—

1. The construction of the rotary cultivating-cylinder made of cutting plates or spades and interposed pushing or clearing boards for removing the earth, as described and represented.

2. The arrangement of the shield-plates P and Q on the shaft L for the purposes set forth in the specification.

3. The arrangement of the rotary harrow B', sustained above the ground and on the rear of the cultivating-cylinder, for breaking and pulverizing the falling earth, as set forth.

GEORGE B. FIELD.

Witnesses:
T. D. MURPHEY,
H. B. MURPHEY.